June 5, 1951 — R. H. MILLER — 2,555,554
AGRICULTURAL IMPLEMENT
Filed Oct. 5, 1946 — 2 Sheets-Sheet 1
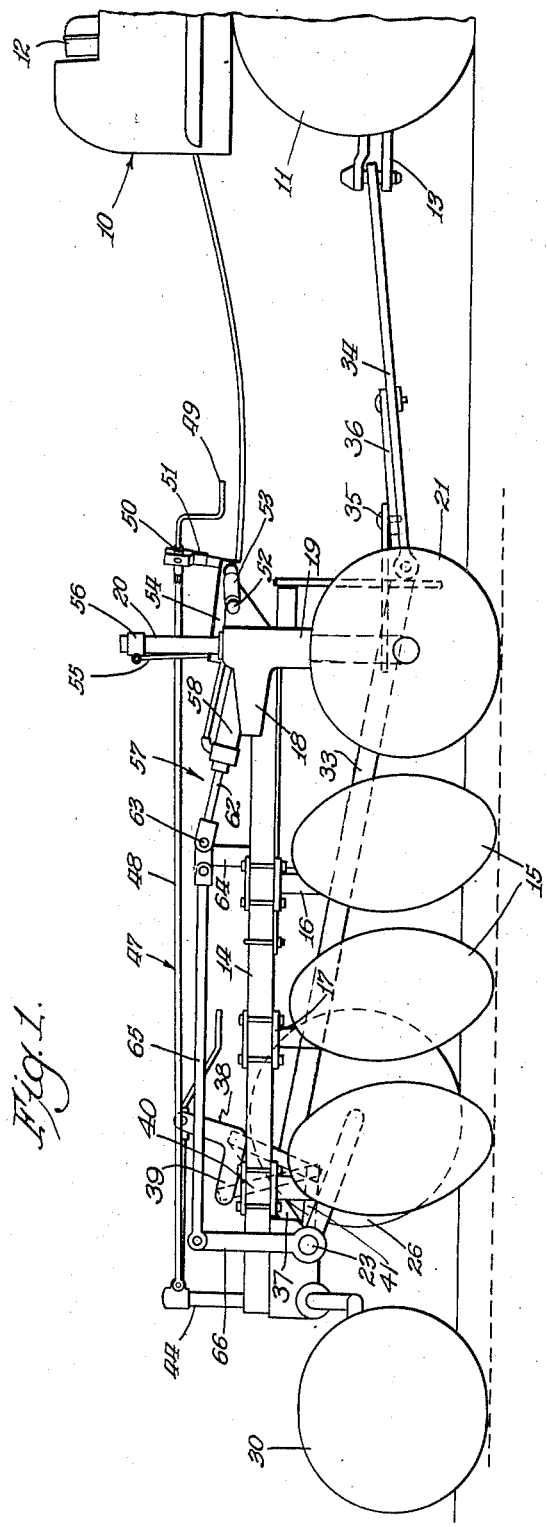
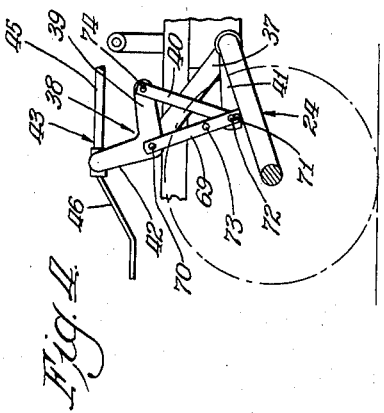
Inventor
Robert H. Miller
By Paul O. Pippel
Atty

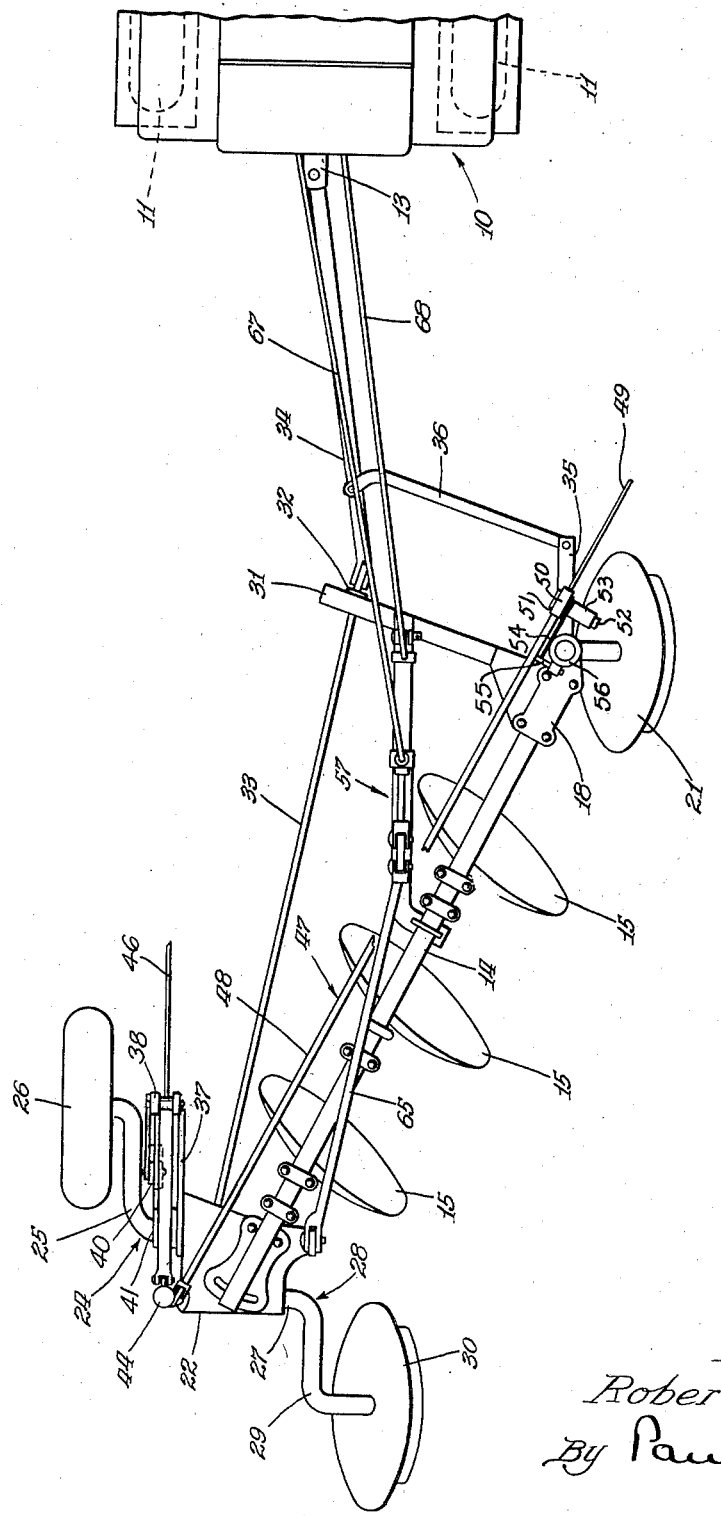

Patented June 5, 1951

2,555,554

UNITED STATES PATENT OFFICE 2,555,554

AGRICULTURAL IMPLEMENT

Robert H. Miller, Canton, Ill., assignor to International Harvester Company, a corporation of New Jersey Application October 5, 1946, Serial No. 701,513

4 Claims. (Cl. 97—50)

This invention relates to agricultural implements and particularly to disk plows and the like. More specifically the invention concerns a tractor-drawn disk plow and mechanism deriving its power from the tractor for moving the disks between operating and transport positions.

A disking implement such as is contemplated by the present invention is a heavy implement wherein the tool supporting beam extends diagonally of the direction of travel and carries a number of cutting disks. An elongated frame is thus provided which extends for a considerable distance behind the tractor and is supported at its rear end by a wheeled truck carrying a land and a furrow wheel, and at the front end by another furrow wheel. The front furrow wheel is adapted to ride in a previously formed furrow, while the rear furrow wheel rides in the furrow being formed.

In such an implement it is customary to provide lift means deriving power from the land wheel for raising and lowering the tools. Power from the land wheel is transferred to the rear furrow wheel and a connecting rod extends substantially the full length of the tool supporting beam from the land or furrow wheel axle to transmit power to lift the front furrow wheel. As pointed out before, many implements of this type are very heavy and the mechanism for lifting them costly. Therefore an object of the present invention is to provide an improved power lift mechanism for a disking implement such as a disk plow.

Another object of the invention is to provide lift means deriving power from the tractor for operating the land and furrow wheels of a disk plow to raise and lower the implement.

Another object of the invention is to provide hydraulic mechanism for lifting a disk plow wherein danger of fouling fluid conduits leading from the tractor to the implement is at a minimum.

A further object of the invention is to provide in an implement movable between operating and transport positions by means of a ram unit mounted thereon, means for holding the implement in its transport position upon removal of the ram unit from the implement.

Other objects and advantages will become clear from the following detailed description when read in conjunction with the accompanying drawings wherein:

Figure 1 is a side elevation of the rear end of a tractor showing a disk plow embodying the features of the present invention attached thereto to be drawn therebehind;

Figure 2 is a plan view of the structure shown in Figure 1;

Figure 3 is a detail showing the hydraulic ram unit mounted thereupon; and

Figure 4 is a view of a portion of the lifting mechanism for the land wheel and showing the manner in which the implement is held in its transport position after the removal therefrom of the ram unit.

Referring to the drawings, the numeral 10 designates a tractor having rear wheels 11, a driver's seat 12, and a draw bar 13.

Attached to the draw bar 13 of the tractor is an implement in the form of a disk plow which comprises a longitudinally extending diagonal frame bar 14 having mounted thereupon at longitudinally spaced locations earth-working disks 15. Disks 15 are mounted upon vertical standards 16 secured to the frame bar by clamps 17.

The frame bar 14 has mounted upon its forward end a casting 18 having a vertically extending bearing portion 19 adapted to receive a vertically extending spindle 20 which is rotatable and slidable in the bearing and is laterally bent at its lower end to provide a mounting for a front furrow wheel 21.

The rear end of the frame bar 14 is supported upon a wheeled truck including a casting 22 adjustably mounted upon the frame bar for adjustment with respect thereto and having mounted in suitable bearings therein for rotation about a transverse axis the transverse portion 23 of a crank axle 24 having a bent portion 25 upon which is mounted a land whele 26. Likewise mounted in suitable bearings in the casting 22 for rotation about a horizontal axis is the transverse portion 27 of a crank axle 28 having a bent portion 29 upon which is mounted a rear furrow wheel 30. The land and furrow wheels 26 and 30 are thus on opposite sides of the frame bar 14.

The front casting 18 is provided with a laterally extending bar 31 having a depending strap 32 secured thereto suitably apertured to receive for sliding movement a longitudinally extending draft bar 33, the rear end of which is connected to the rear casting 22 and the forward end of which passes through the aperture in the strap 32 and is connected to a hitch bar 34 which in turn is pivotally connected to the draw bar 13 of the tractor. Since the implement is connected to the tractor for lateral swinging movement, it is desirable to steer the front furrow wheel 21 to cause the implement to more accurately follow in the path of the tractor, and for this purpose a steering arm 35 is mounted upon the lower portion of the spindle 20 and extends forwardly therefrom. This steering arm is pivotally connected by a link 36 with the hitch bar 34 so that swinging of the bar 34 is transmitted to the furrow wheel 21.

It is desirable, of course, that all the wheels, that is, the front and rear furrow wheels 21 and 30, respectively, and the land wheel 26, be caused to move generally vertically simultaneously to raise and lower the tool carrying frame. This is accomplished by swinging of the crank axles 24 and 28 and the sliding of the spindle 20 carrying furrow wheel 21 vertically in its bearing 19. For this purpose an arm 37 is affixed to the casting 22. This arm extends forwardly and upwardly from the crank axle 24 and has mounted upon its free end a bell-crank 38, one arm 39 of which is connected to a link 40, the other end of which is connected to an arm 41 secured to the transverse portion 23 of the crank axle 24 adjacent the arm 37. Rocking of the bell-crank 38 thus transmits motion through the link 40 and the arm 41 to the crank axle 24 to vertically swing the land wheel 26 with respect to the implement frame. In order to rock the crank axles 24 and 28 simultaneously, the other arm 42 of the bell-crank 38 is connected by an adjustable link 43 to an upwardly extending arm 44 secured to or forming a part of the crank axle 28. Rocking of the bell-crank 38 is thus transmitted through link 43 to the rear furrow wheel 30. The relative positions of the land and furrow wheels 26 and 30, respectively, may be adjusted by manipulating the adjustable link 43 which comprises a sleeve portion 45 threaded to receive the threaded end of a crank 46.

Movement of the land and rear furrow wheels is transmitted to the front furrow wheel by means of a connecting rod 47 comprising a sleeve portion 48 threaded at its forward end to receive the threaded end of a crank 49 which is provided with a swivel 50 pivotally mounted in the bifurcated upper end of an arm 51 carried upon a shaft 52 mounted in a bearing 53 carried by the casting 18. Likewise secured to the shaft 52 is another arm 54 which is connected by a link 55 with a collar 56 secured to the upper end of the spindle 20. Thus rocking of the arm 51 is transmitted through arm 54 and link 55 to slide the spindle 20 vertically in its bearing 19 and adjust the vertical position of the front furrow wheel 21 with respect to the implement frame.

Vertical movement of the wheels 21, 26, and 30 with respect to the tool carrying frame is accomplished by mechanism deriving power from the tractor. This mechanism includes a hydraulic ram unit 57 comprising a cylinder 58 having one end pivotally mounted by means of a removable pin 59 upon a lug 60 secured as by welding to a bracket 61. Bracket 61 has one end affixed to the laterally extending bar 31 and its rear end is secured to the frame bar 14 intermediate the ends thereof. This bracket 61 functions not only as an additional brace for the draft bar 31 but also as a mounting for the ram unit 57.

Cylinder 58 is provided with a piston rod 62 slidable therein and having its free end pivotally connected by a removable pin 63 to the upper end of a lever 64 pivotally mounted upon the bracket 61. Lever 64 is likewise connected by a rod 65 with an upwardly extending arm 66 secured to the free end of the horizontal portion 23 of the crank axle 24 carrying the land wheel 26.

At this point it should be clear that extension of the piston 62 will cause counter-clockwise movement of the arm 66, as viewed in Figure 1, and therefore upward swinging of the land wheel 26 to lower the tool carrying frame to operating position. This upward movement of the land wheel 26 causes the bell-crank 42 to rotate in a clockwise direction as viewed in Figure 1 and to swing crank axle 28 carrying furrow wheel 30 upwardly with the land wheel 26. This motion is transmitted through the connecting rod 47 to raise the front furrow wheel 21.

Cylinder 58 is a two-way cylinder and fluid is transmitted thereto to extend and retract the piston rod 62 through conduits 67 and 68 from a source of power, not shown, on the tractor 10. Inasmuch as the disk plow of the present invention swings laterally about a vertical pivot as the tractor is turned, it is important that the ram unit 57 be mounted generally in line with the hitch pivots and as near the front end of the implement as practicable in order to avoid fouling of the fluid lines 67 and 68, and this has been accomplished by the present invention.

It is also important that the ram unit 57 be readily removable from the implement frame when it is desired to disconnect the implement from the tractor. In such case it is generally important for easy handling of the implement that it be retained in its transport position upon disconnection from the tractor. Since it is no longer held in its transport position by the power lifting mechanism, latching means have been provided for holding the implement in transport. This latch mechanism comprises a link 69 which is pivotally connected at one end to the pivot 70 of the bell-crank 38 upon the arm 37 and at its other end is provided with a slot 71 by which it is connected to the pin 72 connecting link 40 to arm 41. Thus when the link 69 is in the position indicated in Figure 4 with the pin 72 in the slot 71, the bell-crank 38 cannot rock about its pivot and the crank axle 24 cannot swing with respect to the tool-carrying frame. Since all the wheels are connected for simultaneous vertical movement the entire implement is held in its selected transport position. Link 69 is provided with an additional opening 73. When the ram unit 57 is in use and mounted upon the implement frame, the link 69 is disconnected from the pin 72 but is not removed, the opening 73 functioning to receive the pin 74 connecting the upper end of link 40 with the arm 39 of the bell-crank.

It is believed that the operation of the disk plow of the present invention will be understood from the foregoing description. It should likewise be understood that modifications may be made in the invention without departing from the spirit thereof or the scope of the appended claims.

What is claimed is:

1. In a disk plow or the like adapted to be drawn by a tractor, the combination of a diagonally extending tool-supporting frame structure, a wheel supporting structure secured adjacent the rear end of the frame, a crank axle journaled on the supporting structure at the land side of the frame and carrying a wheel, a crank axle journaled on the furrowward side of the supporting structure and carrying a furrow wheel, said crank axles being swingable to raise and lower the plow, a rock arm on the land wheel crank axle for swinging the latter, connecting means between the land wheel crank axle and the rear furrow wheel crank axle for swinging the latter in response to rocking said rock arm, an axle adjacent the forward end of the frame, a furrow wheel carried by the axle, lift means between the axle and the frame for raising and lowering the wheel, a bracket structure adjacent the forward end of the frame and extending laterally therefrom, a hydraulic ram unit pivotally mounted on the bracket and having a piston, means for transmitting fluid under pressure from the tractor to the ram, a rod connecting the piston and the rock arm on the land wheel crank axle for rocking the latter, and, through its connection therewith, the rear furrow wheel axle, and a link connecting one of said crank axles with the lift means for the front furrow wheel, whereby lifting energy is transmitted from the ram unit at the front of the plow to all of the supporting wheels.

2. In a disk plow or the like adapted to be drawn by a tractor, the combination of a diagonally extending tool-supporting frame, a wheeled truck supporting the rear end of the frame including interconnected wheel carrying axles movable to raise and lower the wheels with respect to the frame, a rock arm for moving said axles, a wheel and axle assembly supporting the front end of the frame, lift means for raising and lowering the front wheel, a draft bar bracket secured to the front end of the frame and extending laterally therefrom, a draft bar connected to the diagonal frame and supported by said bracket, a second bracket secured to the first bracket, a hydraulic cylinder and piston assembly carried on the second bracket, a lever pivoted on the bracket, means connecting the piston and the lever, linkage connecting the lever and said rock arm for rocking the latter to move the rear axles, linkage operatively connecting one of said rear axles to the lift means for the front wheel for effecting simultaneous movement of all the wheels to raise or lower the frame, and means for transmitting fluid under pressure to the cylinder.

3. In a disk plow or the like adapted to be drawn by a tractor, the combination of a diagonally extending tool-supporting frame structure, a wheel supporting structure secured adjacent the rear end of the frame, a crank axle journaled on the supporting structure at the land side of the frame and carrying a wheel, a crank axle journaled on the furrowward side of the supporting structure and carrying a furrow wheel, said crank axles being swingable to raise and lower the plow, a rock arm on the land wheel crank axle for swinging the latter, connecting means between the land wheel crank axle and the rear furrow wheel crank axle for swinging the latter in response to rocking said rock arm, an axle adjacent the forward end of the frame, a furrow wheel carried by the axle, lift means between the axle and the frame for raising and lowering the wheel, a connecting link between one of said crank axles and said lift means for actuating the latter simultaneously with the rocking of said crank axles, said link extending generally parallel to and above said diagonal frame, a draft bar bracket secured to the front end of the frame and extending laterally therefrom, a second bracket secured to the first bracket, a hydraulic cylinder and piston unit carried on the second bracket, a lever pivoted on the bracket, means connecting the piston and the lever, and a rod extending between said connecting link and said frame and connecting the lever to said rock arm.

4. In a disk plow or the like adapted to be drawn by a tractor, the combination of a tool-carrying frame, a wheeled truck supporting the rear end of the frame and having land and furrow wheel axles thereon movable relative to the frame, a furrow wheel axle at the front of the frame movable relative thereto, a removable hydraulic ram unit mounted at the forward end of the implement and operatively connected to one of said axles for moving the latter to raise and lower the frame, means for supplying fluid under pressure to the ram unit for the operation thereof, means interconnecting said axles for simultaneous movement thereof including a bell-crank pivoted on the frame adjacent the land wheel, a thrust connection between the land wheel axle and one arm of the bell crank for rocking the latter in response to movement of the axle, connecting means between the other arm of the crank and the other said axles for movement thereof simultaneously with movement of the land wheel axle, and optionally operable means connectable between the frame and the land wheel axle to prevent relative movement thereof and hold the frame in one of its positions.

ROBERT H. MILLER.

REFERENCES CITED

The following references are of record in the file of this patent:

UNITED STATES PATENTS

| Number | Name | Date |
|---|---|---|
| 1,928,952 | Silver | Oct. 3, 1933 |
| 1,969,684 | Bird | Aug. 7, 1934 |
| 2,303,320 | Benjamin et al. | Dec. 1, 1942 |
| 2,309,203 | Morkoski | Jan. 26, 1943 |
| 2,320,742 | Newkirk | June 1, 1943 |
| 2,344,123 | Brown et al. | Mar. 14, 1944 |
| 2,380,323 | Morkoski | July 10, 1945 |
| 2,392,006 | Silver | Jan. 1, 1946 |
| 2,422,530 | Court | June 17, 1947 |